United States Patent
Akhavain Mohammadi

(10) Patent No.: US 11,374,652 B1
(45) Date of Patent: Jun. 28, 2022

(54) METHOD AND APPARATUS FOR LIMITED FLOODING AND NETWORK ROUTING REGION MEMBERSHIP MANAGEMENT

(71) Applicant: HUAWEI TECHNOLOGIES CO., LTD., Shenzhen (CN)

(72) Inventor: Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/117,333

(22) Filed: Dec. 10, 2020

(51) Int. Cl.
| | |
|---|---|
| H04B 7/185 | (2006.01) |
| H04L 41/0681 | (2022.01) |
| H04W 40/02 | (2009.01) |
| H04W 40/24 | (2009.01) |
| H04L 45/00 | (2022.01) |
| H04W 84/18 | (2009.01) |

(52) U.S. Cl.
CPC ..... *H04B 7/18584* (2013.01); *H04L 41/0681* (2013.01); *H04L 45/32* (2013.01); *H04W 40/023* (2013.01); *H04W 40/248* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,930,348 A | 7/1999 | Regnier et al. | |
| 6,147,980 A | 11/2000 | Yee et al. | |
| 6,208,295 B1 | 3/2001 | Dogan | |
| 6,804,199 B1 | 10/2004 | Kelly et al. | |
| 6,816,460 B1 | 11/2004 | Ahmed et al. | |
| 7,613,121 B2 | 11/2009 | Chou | |
| 7,945,272 B2 * | 5/2011 | Kim | H04W 4/029 455/518 |
| 8,147,980 B2 | 4/2012 | Yee et al. | |
| 10,796,251 B2 * | 10/2020 | Mason, Jr. | G06Q 10/04 |
| 2005/0152333 A1 | 7/2005 | Smith | |
| 2005/0198286 A1 | 9/2005 | Xu | |

(Continued)

FOREIGN PATENT DOCUMENTS

| | | |
|---|---|---|
| CN | 1681257 A | 10/2005 |
| CN | 101119372 A | 2/2008 |

(Continued)

OTHER PUBLICATIONS

Sahhaf et al. Scalable and energy-efficient Optical Tree-based Greedy Router, 2013 15th International Conference an Transparent Optical Networks (ICTON) ,Sep. 19, 2013, 5 pages.

(Continued)

*Primary Examiner* — Anh Ngoc M Nguyen

(57) ABSTRACT

A method and apparatus for routing packets in a network, such as a satellite mesh network. Network nodes maintain awareness of network status in a limited surrounding region through flooding notifications. Network nodes route packets by addressing them to a selected other node within part or the entire limited surrounding region. Network nodes adjust the portion of the network to which they route packets to match the limited surrounding region, which changes dynamically due to network events.

20 Claims, 8 Drawing Sheets

(56) References Cited

U.S. PATENT DOCUMENTS

| | | | |
|---|---|---|---|
| 2006/0218225 A1* | 9/2006 | Hee Voon | G06Q 30/02 709/201 |
| 2007/0147254 A1 | 6/2007 | Larsson | |
| 2007/0239349 A1 | 10/2007 | Ohnishi et al. | |
| 2009/0046732 A1 | 2/2009 | Pratt, Jr. et al. | |
| 2010/0008368 A1 | 1/2010 | Karloff | |
| 2012/0014316 A1 | 1/2012 | Rahman | |
| 2012/0173527 A1 | 7/2012 | Thiesson | |
| 2012/0238235 A1* | 9/2012 | Lee | H04W 4/06 455/404.2 |
| 2013/0036236 A1 | 2/2013 | Morales et al. | |
| 2013/0232565 A1 | 9/2013 | O'Connor et al. | |
| 2014/0044008 A1 | 2/2014 | Skalecki et al. | |
| 2014/0126416 A1 | 5/2014 | Yu et al. | |
| 2014/0165163 A1* | 6/2014 | Salkintzis | H04L 29/06551 726/5 |
| 2014/0177522 A1 | 6/2014 | Marshack | |
| 2014/0229405 A1 | 8/2014 | Govrin | |
| 2014/0278590 A1 | 9/2014 | Abbassi | |
| 2014/0379929 A1 | 12/2014 | Cicic et al. | |
| 2016/0057004 A1 | 2/2016 | Ge | |
| 2016/0323175 A1 | 11/2016 | Liu | |
| 2017/0117978 A1 | 4/2017 | Ko | |
| 2017/0239394 A1 | 8/2017 | Fromm et al. | |
| 2019/0104056 A1 | 4/2019 | Poorrezaei | |
| 2019/0356498 A1* | 11/2019 | Hernandez Sanchez | H04L 43/0894 |
| 2020/0162335 A1 | 5/2020 | Chen et al. | |
| 2020/0382445 A1 | 12/2020 | Calmon | |
| 2021/0194808 A1 | 6/2021 | McCormick | |
| 2022/0026519 A1 | 1/2022 | Wu et al. | |

FOREIGN PATENT DOCUMENTS

| | | |
|---|---|---|
| CN | 102116456 A | 7/2011 |
| CN | 102752725 A | 10/2012 |
| CN | 103891352 A | 6/2014 |
| CN | 103986512 A | 8/2014 |
| CN | 104579454 A | 4/2015 |
| CN | 105657777 A | 6/2016 |
| CN | 107070798 A | 8/2017 |
| CN | 107231183 A | 10/2017 |
| CN | 107979409 A | 5/2018 |
| CN | 108390713 A | 6/2018 |
| CN | 108353439 A | 7/2018 |
| CN | 108449774 A | 8/2018 |
| CN | 108989223 A | 12/2018 |
| CN | 110505153 A | 11/2019 |
| CN | 111587580 A | 8/2020 |
| EP | 2853066 A1 | 4/2015 |
| EP | 2853068 A1 | 4/2015 |
| WO | 2016069077 A1 | 5/2016 |
| WO | 2019173127 A1 | 9/2019 |
| WO | 2020113214 A1 | 6/2020 |
| WO | 2020193445 A1 | 10/2020 |

OTHER PUBLICATIONS

Akhavain Mohammadi, Mehdi Arashmid U.S. Appl. No. 17/167,540, filed Feb. 4, 2021.

Edoardo Benzi et al. "Optical Inter-Satellite Communication: the Alphasat and Sentinel-1A in-orbit experience"; SpaceOps Conferences, May 16-20, 2016, Daejeon, Korea; 14th International Conference on Space Operations.

Hemani Kaushal et al. "Optical Communication in Space: Challenges and Mitigation Techniques": Citation information: DOI 10.1109/COMST.2016.2603518, IEEE Communications Surveys & Tutorials.

M. Gregory et al. "TESAT laser communication terminal performance results on 5.6Gbit coherent inter satellite and satellite to ground links"; International Conference on Space Optics—ICSO 2010. Rhodes Island, Greece, Oct. 4-8, 2010.

Zengyin Yang et al. "Modeling and Routing for Predictable Dynamic Networks"; arXiv.org > cs > arXiv:1704.00885; Aug. 17, 2018.

"Iridium NEXT: A Global Effort to Launch the Future of Global Communications"; Apr. 19, 2013 | Featured Stories, Iridium NEXT.

Hueseyin Uzunalioglu et al. "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave. , Ste. 600, Washington. D.C., District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference on Transparent Optical Networks (ICTON) , Sep. 19, 2013, 5 pages.

McCormick, William Carson et al. U.S. Appl. No. 16/721,171, filed Dec. 19, 2019.

Halabian, Hassan et al. U.S. Appl. No. 16/888,023, filed May 29, 2020.

Ashwood-Smith, Peter et al. U.S. Appl. No. 16/887,675, filed May 29, 2020.

McCormick, William Carson U.S. Appl. No. 16/882,952, filed May 26, 2020.

Akhavain Mohammadi, Mehdi Arashmid et al. U.S. Appl. No. 17/141,824, filed Jan. 5, 2021.

Akhavain, Mohammadi, Mehdi Arashmid U.S. Appl. No. 17/140,668, filed Jan. 4, 201.

Akhavain Mohammadi, Mehdi Arashmid U.S. Appl. No. 17/16/,540, filed Feb. 4, 2021.

Ericsson Latency analysis of SCell BFR solutions 3GPPTSG-RAN }VGI Meeting #97, R1-1907438 May 17, 2019 (May 17, 2019), 4 pages.

* cited by examiner

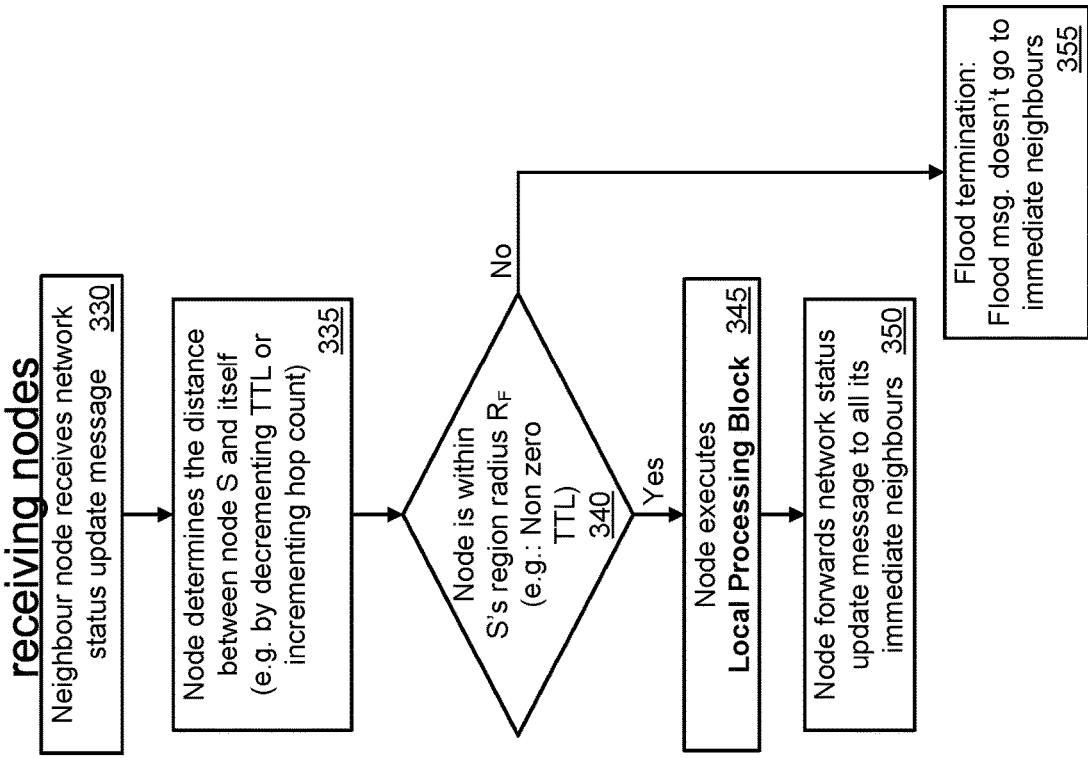
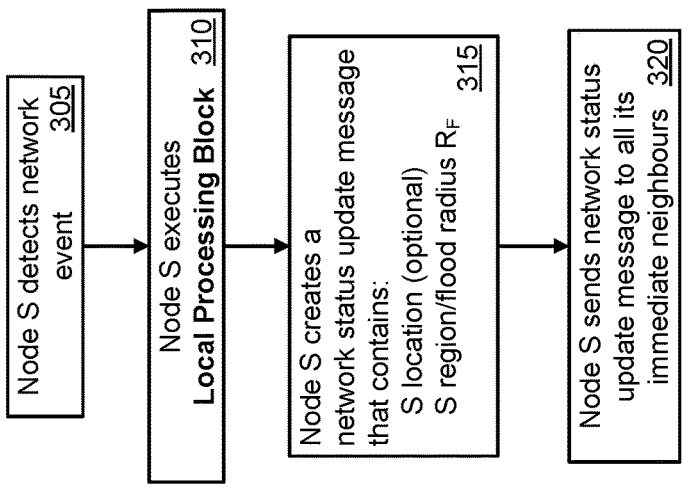
FIG. 3B
FIG. 3A

METHOD AND APPARATUS FOR LIMITED FLOODING AND NETWORK ROUTING REGION MEMBERSHIP MANAGEMENT

CROSS-REFERENCE TO RELATED APPLICATIONS

This is the first application filed for the present invention.

FIELD OF THE INVENTION

The present invention pertains to packet-based data networks, such as satellite mesh networks, and in particular to a method and apparatus for supporting packet forwarding and routing in such networks by managing the set of nodes toward which a given node can transmit packets.

BACKGROUND

Low earth orbit (LEO) satellite constellations are being developed to provide, among other things, Internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. Use of LEO satellite systems generally leads to lower latency than medium earth orbit or geostationary orbit systems, but requires large numbers of satellites.

Data packets can be routed through a satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

More generally, mobile ad-hoc networks involving rapidly or frequently moving network nodes can be created in which peer-to-peer network connections are subject to significant and rapid change over time. The nodes can be associated, for example, with cars, portable mobile base stations, balloons, drones, satellites, or a combination thereof. The network movement may extend across large geographical areas. Such networks can be referred to as having hyper dynamic network topologies. In such networks, it is challenging to maintain awareness of the current and future available network connections, and thus network routing is problematic. Even if network connections can be predicted, propagating notifications of network events such as link failures can be costly in terms of resource usage, and can be difficult to perform in a timely manner.

Therefore, there is a need for a method and apparatus for supporting packet routing and forwarding in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for network routing region membership management. This may involve managing the set of nodes toward which a given node can transmit packets in a network such as a satellite network. The given node can transmit packets toward a final destination node via such nodes. Network routing region membership management may be performed in order to support packet forwarding and routing in the network. Embodiments of the present invention also involve limited flooding of network status update messages. Embodiments may be applied in networks utilizing orthodromic or piecewise shortest path first routing schemes. Embodiments of the present invention may be used in particular where network nodes have limited information about the network, and must make packet routing decisions based on this limited information. For example, each network node may be configured to receive network status update messages only for network events within a limited region around that network node. The network node can route packets to another node within that limited region, in such a manner that the packet is thereby routed closer to its destination. In particular, under such a scenario, embodiments of the present invention provide for a mechanism by which the limited region within which the network node routes packets (referred to as the routing region) is adjusted to match the limited region for which the network node is expected to have up-to-date network status information (referred to as the monitored region). This mitigates the potential for routing errors or failures.

According to some embodiments, the limited region within which packets are routed is adjusted in response to network status update messages. Accordingly, embodiments of the present invention provide a method for region membership management by a node in a network. The method includes maintaining a network status for a limited region of the network, which may be communicatively coupled to the node. The network status includes availability of communication links between network nodes in the limited region. The method further includes restricting routing of packets only toward ones of said network nodes in the limited region and only via ones of said communication links within the limited region. The method further includes receiving a notification of a network event (i.e. a network status update message) corresponding to another node of the network or corresponding to a link of the network. The method further includes, for example when the network event is within a predetermined distance of the node, adjusting the network status and the limited region based on the notification of the network event. Accordingly, the limited region is adjusted to consist essentially of certain nodes of the network and links of the network. For example, the limited region can be adjusted to consist essentially of nodes (and links) to which the node can transmit packets, given limited propagation characteristics of said packets. As another example, the limited region can be adjusted to consist essentially of nodes (and links) for which the node is able to receive further notifications of network events, given the network status for the limited region and further given network event notification (i.e. network status update message) propagation characteristics for the network.

In some embodiments, when the network event is within the predetermined distance of the node, transmitting the notification of the network event to immediately neighboring nodes of the network. In some embodiments, maintaining the network status comprises maintaining routing information for the limited region of the network.

Embodiments of the present invention provide for a method for supporting packet routing by a first node in a network. The method includes maintaining a network status for a limited region of the network having a membership. The membership defines a plurality of nodes within the limited region. Each node in the membership is connected to other nodes through links within the limited region. The limited region is associated with the first node and having a predefined radius from the first node. The method includes receiving a first notification of an event associated with at least one of a node in the membership or a link within the limited region. The method includes adjusting the membership of the region in accordance with the received first notification to maintain the predefined radius of the limited region. The method includes transmitting to the original membership or to the adjusted membership of the limited region a second notification determined in accordance with the first notification. Transmitting the second notification to the original membership may improve reliability.

Embodiments of the present invention provide for an apparatus for supporting packet routing in a network. The apparatus is located at a first node of the network. The apparatus includes a network interface and processing electronics. The apparatus is configured to maintain a network status for a limited region of the network having a membership, the membership defining a plurality of nodes within the limited region. Each node in the membership is connected to other nodes through links within the limited region. The limited region is associated with the first node and has a predefined radius from the first node. The apparatus is configured to receive a first notification of an event associated with at least one of a node in the membership or a link within the limited region. The apparatus is configured to adjust the membership of the region in accordance with the received first notification to maintain the predefined radius of the limited region. For certainty, the adjusted membership is the membership after performing such an adjustment. The apparatus is configured to transmit to the membership or the adjusted membership of the limited region a second notification determined in accordance with the first notification.

In various embodiments, the predefined radius is defined by a distance to the first node. For example, the predefined radius may be defined by a number of network hops to the first node.

In various embodiments, the membership is adjusted to consist essentially of nodes of the network and links of the network to which the node can transmit packets, given limited propagation characteristics of said packets. In various embodiments, the membership is adjusted to consist essentially of nodes of the network and links of the network for which the node is able to receive further notifications of events, given the network status for the limited region and further given event notification propagation characteristics for the network.

In various embodiments, the first notification and the second notification are indicative of occurrence of the event, the event affecting the network status. In various embodiments, the network status includes availability of communication links between nodes in the limited region. In various embodiments, maintaining the network status includes maintaining routing information for the limited region of the network.

In various embodiments, the method further includes, and the apparatus is further configured to transmit the second notification only to immediately neighboring nodes of the first node which are within a predetermined distance of the event. In various embodiments, the method further includes, and the apparatus is further configured to adjust the network status, transmit the second notification, or both adjust the network status and transmit the second notification of the event when the event is within a predetermined distance of the node.

In various embodiments, the event is determined to be within or outside of the predetermined distance of the node based on one or more of: a hop counter communicated with the first notification; a time to live counter communicated with the first notification; and an indication of distance between the event and the first node which is determined based on information included in the first notification.

Related embodiments of the present invention provide for a method involving multiple nodes of the network, where plural nodes perform operations commensurate with the above-described method.

Related embodiments of the present invention provide for an apparatus for supporting packet routing by a node in a network, the apparatus located at a node of the network, the apparatus comprising a network interface and processing electronics and configured to perform operations commensurate with the above-described method.

Related embodiments of the present invention provide for a system comprising multiple apparatuses forming a network, where one, some or all of the apparatuses are configured as described above.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIGS. 3A to 3C illustrate network node operations provided in accordance with an embodiment of the present invention.

It will be noted that throughout the appended drawings, like features are identified by like reference numerals.

DETAILED DESCRIPTION

Figure 1:
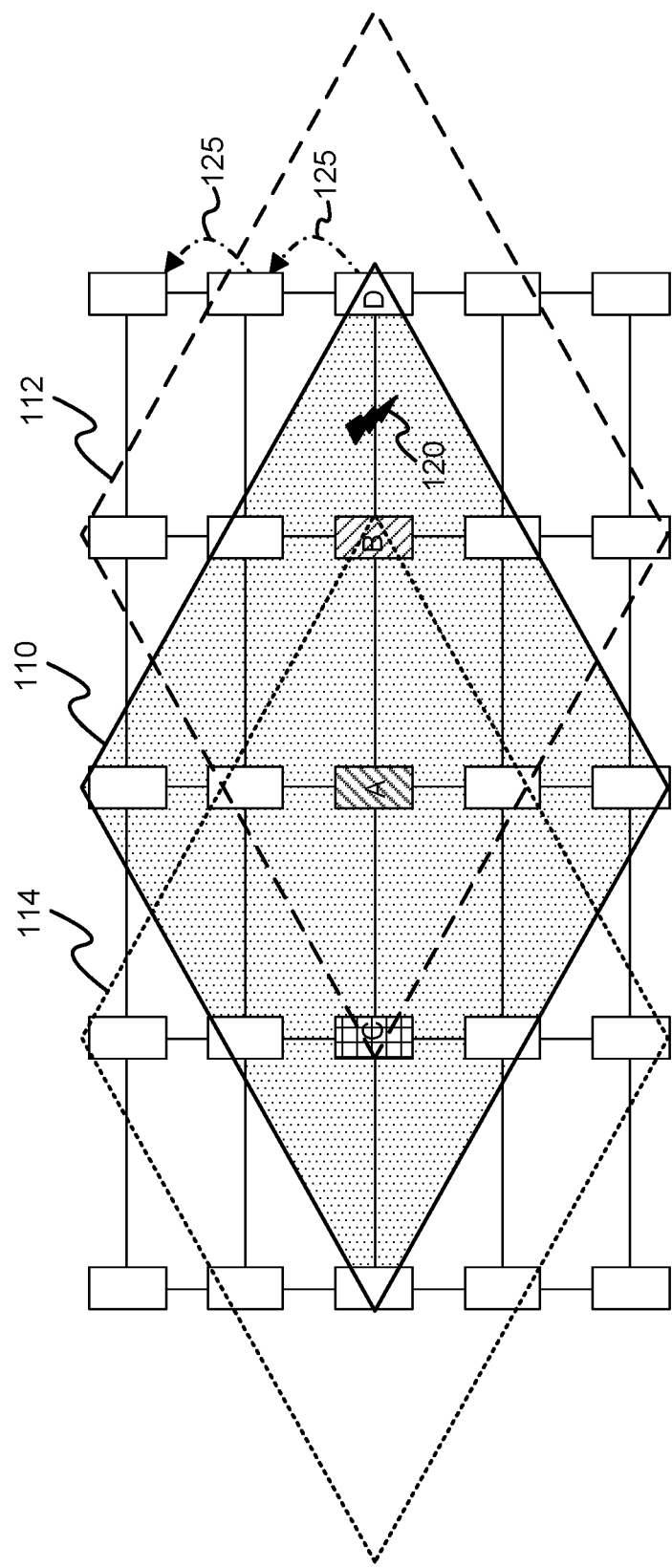
FIG. 1 illustrates a portion of a communication network including three nodes with associated limited flood regions, according to an embodiment of the present invention.

As used herein, the term "about" should be read as including variation from the nominal value, for example, a +/−10% variation from the nominal value. It is to be understood that such a variation is always included in a given value provided herein, whether or not it is specifically referred to.

Satellite-based networks potentially provide global connectivity and may also provide new coverage extensions in Fifth Generation (5G) communications technologies, as defined for example by the $3^{rd}$ Generation Partnership Project (3GPP). Overall industry interest is to deploy inter-satellite links to route user traffic over multiple satellites. In this regard, use of low earth orbits (LEO) satellite systems may be appropriate, as such systems have lower round trip latency and lower launch costs compared to Medium earth orbit (MEO) and Geostationary earth orbit (GEO) systems. However, an effective global network requires potentially large numbers of LEO satellites. On the other hand, the dynamic nature of satellite network constellations presents challenges for existing routing protocols due for example to the existence of an orbital seam e.g. in a polar constellation, or between multiple seams in a Walker Delta constellations, the size of network, and the requirement to timely communicate network changes to all nodes as they occur.

While GEO satellites are stationary to the side of the earth they are facing, MEO and LEO satellites are considered to be mobile with some time periodicity. That is, they meet the same point of the earth after a specific time period which is dependent on their altitude. GEO satellites are located at 22,236 miles (35,786 kilometers) above Earth's equator. Due to high altitude of these satellites and long round trip delay, GEO satellites are not a proper option for broadband, low delay data networks. LEO satellites however, provide global coverage over the earth and are capable of reusing frequency more effectively. LEO satellite networks can provide ubiquitous connectivity with low latency. A characteristic of these satellite networks is that many satellites are typically needed to provide global coverage, mainly due to the low altitude of the individual satellites.

In satellite communication technologies, a satellite constellation is defined as a group of satellites with coordinated ground coverage and shared control rotating in LEO orbits. Two main satellite constellations are "polar constellation" and "Walker Delta constellation". Walker Delta constellations are thought to provide better uniform coverage over the earth almost everywhere except poles, where no coverage is provided. Polar constellations however provide a dense coverage over the poles and less dense coverage over the equator.

Satellite network nodes may have two types of interfaces: Ground communication interfaces, and Inter-satellite link (ISL) communication interfaces. The ground communication interfaces can be microwave systems operating in X-band or ka-band. The ISL interfaces can use communication lasers and can provide for high-speed optical free-space communication links between the satellite nodes. ISL links include intra-orbit links, i.e. links between (typically adjacent) satellites in a common orbit but spaced apart, and inter-orbit links, i.e. links between satellites in different (typically adjacent) orbits.

Due to the dynamic nature of the satellite networks, the ISL characteristics also change dynamically. Even for ISLs where link distance is constant, the link behavior may change as the satellites pass over different parts of the earth (e.g. at the poles). The dynamic range of characteristics for the ISLs is significantly larger for inter-orbit ISLs for both polar and walker delta constellations. Due to the dynamically changing ISL links, attributes the network topology in satellite networks is considered to change dynamically. The impact of network topology changes, link failures and link creations, link level optical impairments as well as Doppler Effect makes packet routing a significant challenge in satellite data networks. This is particularly the case in dense LEO satellite networks where network events are frequent. Packet addressing is another challenge. Additionally, satellite onboard processing capability is limited and therefore it is desirable to limit the amount of onboard processing that is required to perform functions such as network routing.

One issue in satellite networks relates to flooding behavior and integration with ground segments of the network. Internet protocol (IP) based routing does not scale well with very large flat satellite networks requiring minimum delay (distance) routing. This is due to the fact that the satellite network topology is dynamic and minimum distance paths change over time. Flooding is a mechanism by which network nodes, such as satellites, propagate notifications of a network event, such a link failure, to other network nodes. In particular, the network node initially detecting the network event notifies its neighbour nodes, which in turn may notify their neighbour nodes, and so on.

Link failures occur frequently in large scale massive satellite networks. In single-hop geographical routing with link failures, alternate path routing may take packets farther from their destination. This tends to lead to failure of single-hop geographical routing. This problem arises due to the fact that the entire region of the network may not be visible to each node. Since performing network status update messaging (e.g. via flooding) is time consuming, network convergence is relatively slow. When network status changes are frequent, this can result in network information at each node failing to adequately track the actual network state.

In networks involving mobile nodes, such as LEO satellite nodes, the relative motion of satellites with respect to each other, ground nodes, or both, can result in time-varying network topology and link availability. Maintaining routing tables and link state information globally therefore becomes a challenging task. It is therefore useful to consider alternative routing methods, which can be implemented using limited information. The limited information may include node location and link state information for only those nodes in a local neighbourhood of a given node making a routing decision.

For example, when using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it may be desirable to determine which target satellite is currently closest (or adequately close) to the ground destination so that the packet can be routed along a path toward that satellite.

Embodiments of the present invention provide for a method, apparatus and system for network routing region membership management, for example for use in supporting packet routing in a network. The network may be a hyper dynamic network, for example. Packet routing support can include packet routing, or at least maintaining of network status information that can be used for routing support. The network status information can be maintained (kept up-to-date) using network status update messages (also referred to as notifications of events) communicated between network nodes, for example via flooding protocols. Packet routing includes determining a path through the network which the packet is to be forwarded along, and transmitting the packet to a node along that path, for example by forwarding it to the next hop node along the path.

Embodiments of the present invention address network routing challenges in the context of satellite networks. Specific focus is in the application to non-terrestrial massive (satellite) polar and Walker-Delta constellation networks in order to provide global communications services that may not be supported by terrestrial (e.g. wire line or fibre-based) networks. The networks are generally considered to be flat, i.e. non-hierarchical, without necessarily being separated into multiple routing areas. Various embodiments provide for a flat network routing paradigm in which each network node is only required to have limited knowledge of network conditions, for at least some portions of the network. This limits the requirement to propagate network condition updates (e.g. via flooding link status update messages) through the network. In particular, in various embodiments, network status update messages (e.g. in the form of link state advertisements) are communicated locally to a limited set of other nodes (e.g. defined based on the node generating the update initially). The network status updates may indicate availability of communication links between nodes. Network status update messages generated by some nodes in the network therefore do not necessarily reach other (e.g. far away) nodes of the network. This allows each node of one or more nodes to maintain network status information for a limited region of the network which is communicatively coupled to that node. It is noted that embodiments of the present invention are not necessarily limited to satellite networks. Embodiments can be applied to fixed or mobile terrestrial networks, or combination terrestrial and satellite networks.

By considering flat networks which are not separated into multiple routing areas, embodiments of the present invention allow for a relatively simple networking paradigm that considers a single routing area. This can be particularly important when implementing networks in which nodes are highly mobile, for example in the case of satellite networks.

Restricting communication of network status update messages to a limited set of other nodes can be done in a variety of ways. In some embodiments, the network status update messages are propagated using a flooding protocol and the messages are configured to include a time to live (TTL) counter initially set to a predetermined value. The network status updates include notifications of events corresponding to nodes or links of the network. Each network node which forwards the network status update message onward adjusts (e.g. decrements) the counter before forwarding. Each network node receiving the network status update message checks the current (or adjusted) value of the counter, forwards the network status update message onward if the value of the counter is above a predetermined threshold (e.g. zero) and discards the network status message without forwarding it otherwise. A hop counter which is incremented upon forwarding can be used as an alternative to a TTL counter which is decremented. Other approaches for restricting communication to a limited set of nodes are also possible. For example, the network status update message can include an indication of origin, which can be the network or physical location of the node generating the network status update message or the network or physical location of the network event which is the subject of the network status update message.

Nodes receiving the network status update message can selectively forward or discard the network status update message based on location. For example, a node can compare the indication of origin location to the node's own location, or to the location(s) of the node's neighbour(s). When the distance between the two locations is less than a predetermined threshold, the node can forward network status update message to one or more of its neighbours. Otherwise the network status update message can be discarded. For example, the node can forward the network status update message to all of its neighbours when the node falls within a certain distance of the update message's origin. As another example, the node can forward the network status update message to all of its neighbours (if any) which themselves fall within a certain distance of the update message's origin. For global or satellite networks, instead of distance, forwarding decisions can be made based on a combination of distance and latitude and longitude, or coordinates in another coordinate system (e.g. rectangular or polar coordinates). As another approach, network nodes can randomly forward or discard network status update messages. The randomization can optionally be based on a parameter which is carried with the network status update message and modified upon forwarding of the network status update message. Accordingly, based on physical or network location information, or based on hop count or TTL count, nodes can determine whether a network event is within a predetermined distance of the node itself, or within a predetermined distance of a prospective node toward which packets might be transmitted. Based on this determination, the notification of the network event (i.e. the network status update message) can be selectively forwarded (or not forwarded) to immediate neighbour nodes.

Methods and apparatus for packet forwarding in networks with limited information as described above can be implemented. Potentially applicable methods are described for example in U.S. patent application Ser. Nos. 16/888,023 and 16/887,675, which are hereby incorporated herein by reference. Generally speaking, a network node retains network status information for a limited region, i.e. less than all, of a network. When the node is required to transmit or forward a packet to a destination outside of this limited region, it can select a target node within its limited region of the network that is "closer to" the destination and transmit the packet toward this target node. In some cases, the packet destination can be identified in part by its physical (e.g. geographic, spatial or spatio-temporal) location, and the physical locations of nodes within the limited region of the network can be tracked by the network node. In this case, the node can select the target node as a node which is physically closer to the destination, based on this physical location information. The node then forwards the packet toward the target node along a determined, typically multi-hop, network path. The determined network path typically lies fully within the limited region of the network as seen by the node. The process can be repeated by the target node upon receipt, by intermediate nodes between the node and the target node (upon receipt of the packet), or a combination thereof. According to this approach, routing is performed over portions of the network which the network node has full awareness for, even though no network node necessarily has full awareness for the entire network. In this manner, nodes restrict the routing of packets so that packets are routed only toward network nodes in a limited region, typically coinciding with a region for which the node maintains full network status information.

Geographic routing may be implemented in support of such packet forwarding. That is, the physical or network location of a packet's destination can be specified in such a manner that a node can determine which node(s), among those in its limited routing portion of the network, are relatively closer to the packet's destination. This can be performed even without having information regarding the status of the part of the network near the packet's destination. For example, the packet's destination can be specified using geographic coordinates, and each node can maintain an indication of geographic coordinates of all nodes in its own limited routing portion.

FIG. 1 illustrates a portion of a communication network including three nodes A, B and C with respectively associated limited flood regions 110, 112, 114. A fourth node D is also shown. A flood region corresponds to the portion of a network which is expected to receive a network status update message via flooding, given network node behaviour as a whole. This can be contrasted with the related concept of a monitored region, which is the portion of the network for which a node reliably receives network status update messages. The limited flood regions are established by causing nodes A, B, C and D to generate network status update messages with a TTL counter initially set to two, and causing all nodes (other than the originating nodes) to decrement the TTL counter and forward the network status update message to all of its connected neighbours if the decremented TTL counter is greater than zero. As an example, when node D detects a link failure 120, it transmits network status update messages, e.g. 125 to its immediate neighbours.

It has been recognized by the inventors that the same network status changes which typically trigger network status update messages (e.g. link failures or link connections) also potentially affect the flood regions for nearby nodes, and similarly affects the monitored regions for nearby nodes. For example, node A in FIG. 1 is typically within two hops of node D and is therefore typically expected to receive network status update messages initiated by node D. However, when the link failure 120 occurs, node A is no longer within two hops of node D. That is, node A no longer includes node D in its monitored region. Therefore, without further measures being taken, node A will not receive network status updates from node D. (In this example it is assumed, for simplicity, that node B (immediately between nodes D and A) does not generate its own network status update message in response to the link failure 120.) Such impediments to propagation of network status update messages can impact operation of the network. For example, node A can not be certain to have full information for the portion of the network within two hops of itself, and hence routing errors can occur.

According to embodiments of the present invention, measures are taken to adjust network node behaviour to compensate for the above-mentioned impediments to the propagation of network status update messages. Such measures generally involve causing network nodes to perform region membership management to match the limited region in which they route packets to the limited region for which those network nodes have full network status information. As mentioned above, the limited region in which a network node routes packets is referred to as that network node's routing region, and the limited region for which a network node has full network status information is referred to as that network node's monitored region. These measures account for the fact that to the monitored region can change due to network status changes, such as the network status changes that trigger network status update messages. Notably, according to embodiments of the present invention, routing regions are not necessarily pre-configured e.g. by an administrator, and the routing regions are not constant. The routing regions may be dynamic. Each node may adjust its routing region according to a radius value that may be specific to that node. The radius value may be a preconfigured, constant value. The radius value may indicate a maximum distance, for example expressed as a number of hops, that a network status update message can propagate. While this radius and maximum distance may be constant, link events may cause changes to the length of paths taken by potential network status update messages, and therefore the routing regions may change. The initial radius value determines an initial topology graph and boundary for a node's region. In response to a link event, a node adjusts its region's topology graph, shape or boundary in order that all nodes in the topology graph are still reachable given the network status update message propagation characteristics. For example, a node can remove portions of its region's topology graph if, after a link failure event, a network status update message would be required to travel more than the maximum distance in order to reach the node.

In some embodiments, in association with a limited flooding protocol, a network node is configured to adjust the limited region in which it routes packets (the routing region) based on the current network status. Adjusting the limited region in order to maintain the configured reachability limit can equivalently be referred to as adjusting the membership of the region, where the membership refers to the network nodes that are defined as being included within the limited region. The current network status and the routing region may be adjusted in response to network status update messages received at the network node. In some embodiments, the network node performs region membership management by updating its routing region to match its monitored region. The routing region may be adjusted to consist essentially of network nodes and links to which the node can transmit packets, given limited propagation characteristics of said packets. For example, if packets, such as data packets, are limited to traverse a certain distance, such as a certain number of hops or a certain physical distance, then the limited region can be adjusted to consist essentially of nodes (and links) reachable by packets of this type. As another example, the limited region can be adjusted to consist essentially of nodes and links for which the node is able to receive further notifications of events, given the network status for the limited region and further given event notification propagation characteristics for the network. Accordingly, the network node routes packets only within its monitored region, which can change due to network events.

Region membership management, e.g. dynamic adjustment of a node's routing region, involves expanding or contracting the routing region based on current network status information. Each node's routing region may be adjustable up to a maximum size. The routing region does not necessarily follow a predefined shape, but rather is adjusted in response to network conditions.

According to embodiments of the present invention, a network node is associated with a limited region. This limited region has a membership, which defines a plurality of nodes within the limited region. For example, the membership can include all nodes in the limited region. The nodes in the membership are connected to other nodes (e.g. also in the membership) via links which also reside within the limited region. Each node can be associated with its own limited region and corresponding membership. The limited region can be viewed as having a predefined radius from the first node. For example the limited region can have a predefined radius which is defined by a distance to the first node, for example in terms of physical distance or hop count. The radius can be, for example, a distance of x km from the first node, or x hops from the first node, for some value of x. The membership is adjusted based on network events.

In various embodiments, a node maintains network status only for the limited region. Furthermore, the membership of the limited region is adjusted, in view of notifications of network events (network status updates), to maintain the radius of the limited region. For example, the limited region can be adjusted to consist essentially of nodes (and links) to which the node can transmit packets, given limited propagation characteristics of said packets. As another example, the membership may be adjusted to consist essentially of nodes of the network and links of the network for which the node is able to receive further notifications of events, given the network status for the limited region and further given event notification propagation characteristics for the network. The membership changes based on link events. The membership for a node's limited region may change such that the node is reachable by network status update messages from every node of the membership. Additionally or alternatively, the membership for a node's limited region may change such that each node in the membership is reachable by packets transmitted from the node. The limited region may be expressed using a topology graph having a radius value. A node may re-evaluate its topology graph and membership in response to link events, such that the node can reach the membership based on its configured radius value.

FIGS. 2A to 2F illustrate dynamic adjustment of a node's routing region and membership in response to a network event in the form of a link failure, in accordance with an example embodiment of the present invention. It is assumed, for simplicity, that all nodes are interconnected according to a two-dimensional regular grid. It is further assumed that, when a first network node detects a link failure, the network attempts to notify all other network nodes within three hops of the first network node of the link failure. This can be performed for example by using flooding to propagate network status update messages indicative of the link failure, while limiting the number of times the network status update messages (initially created by the first node) are forwarded by other nodes. In particular, each network status update messages is discarded after being transmitted three times (i.e. transmitted an initial time and forwarded two more times by nodes in receipt of the initial transmission), thus limiting the number of hops it can traverse to three.

Figure 2B:
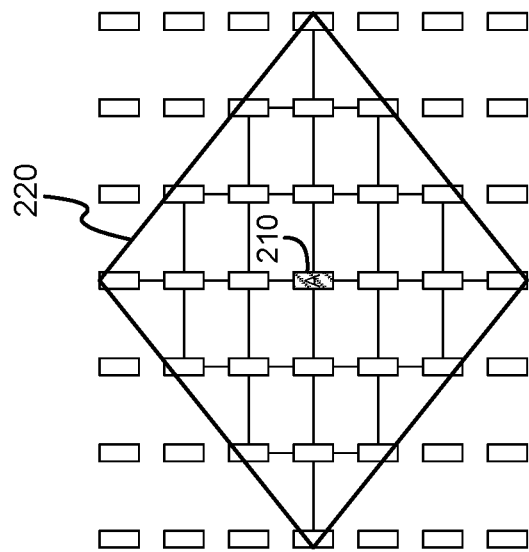
FIGS. 2A to 2F illustrate dynamic adjustment of a node's routing region in response to a network event in the form of a link failure, in accordance with an example embodiment of the present invention.
Figure 2A:
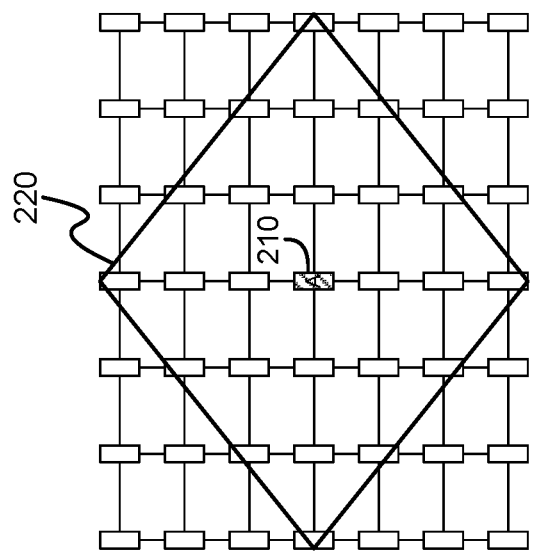

FIG. 2A illustrates a first node 210 along with its diamond-shaped initial monitored region 220, according to the above scenario. The initial monitored region 220 is the region for which the first node 210 can be expected to reliably maintain awareness of network status, assuming that there are no link or node failures that would impede the propagation of network status update messages to the first node (e.g. via flooding). The nodes within the region 220 can be referred to as the membership for a limited region, relative to the first node 210. The nodes within the region 220 can be referred to members of the limited flood region, relative to the first node 210. FIG. 2B illustrates the first node 210 and its initial monitored region 220 only, with no links visible outside of the initial monitored region. This emphasizes that the first node 210 does not necessarily have information indicative of the status of links outside of the initial monitored region 220. FIG. 2B also illustrates that the routing region can be initially set equal to the initial monitored region 220, under the interpretation that FIG. 2B illustrates the routing region for the first node 210. FIG. 2B also illustrates the topology/connectivity graph from the point of view of node 210, including ECMP paths. FIG. 2C illustrates (in dashed lines) a three-hop shortest-path first routing tree 225 for the first node 210. The routing tree 225 is provided assuming (for simplicity) that no equal cost multipath (ECMP) measures are being taken. The routing tree 225 defines the path by which the first node 210 would route a packet to another node within the initial monitored (routing) region 220, in absence of any node or link failures within the region 220.

Figure 2D:
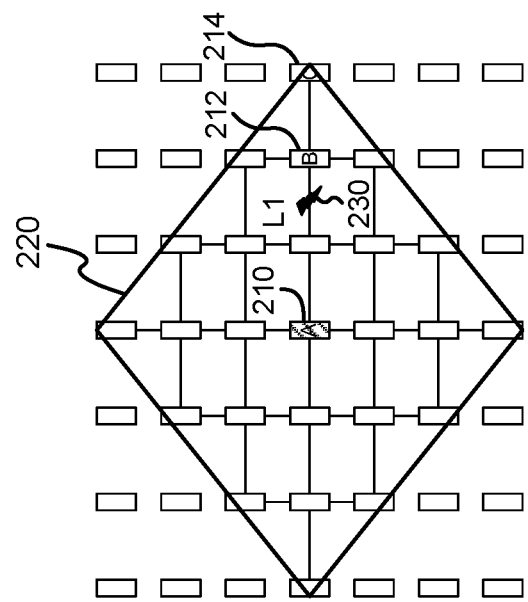
Figure 2C:
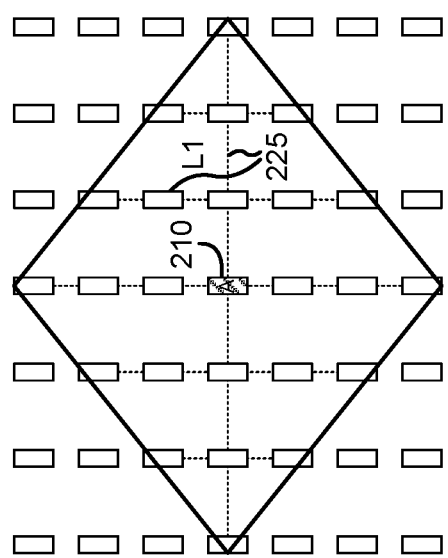

FIG. 2D illustrates the occurrence of a network event—a failure of link 230 within the first node 210's initial monitored region 220. Notably, there is still connectivity between the first node 210 and the nodes 212 and 214. Moreover, the paths supporting such connectivity lie entirely within the initial monitored region 220. However, the first node's monitored region is no longer equal to the initial monitored region 220. This is because, for example, a network status update message initiated by node 212 (e.g. indicative of another link failure) would have to traverse more than three hops in order to reach the first node 210. Therefore, the first node cannot be guaranteed to have full knowledge of network status for portions of the network reported by node 212. Therefore, according to embodiments of the present invention, the first node, in response to receiving a network status update indicative of the failure of link 230 is configured to perform region membership management by adjusting its routing region. In particular, the first node adjusts its routing region to remove those nodes and links which can no longer form part of the first node's monitored region in which each node must be at most three hops away from the first node 210. The monitored region can also be considered to be adjusted in the same manner. The membership of the limited region can also be considered to be adjusted in the same manner. That is, the membership can be adjusted in response to the network status update message to remove, from the membership, node 212 and node 214. The monitored region may be, but is not necessarily explicitly tracked. Rather it is used here for illustrative purposes.

Figure 2F:
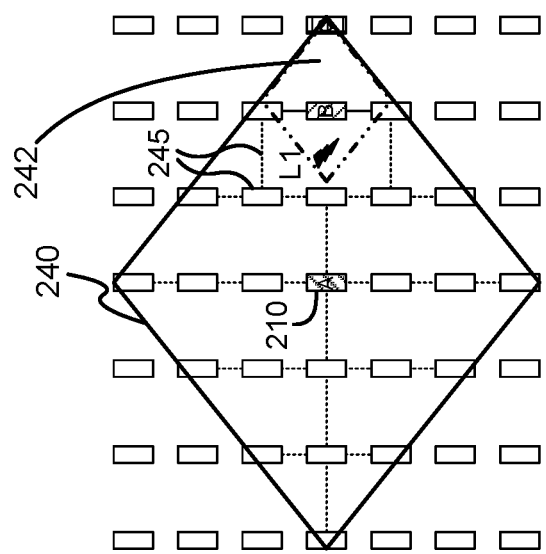
Figure 2E:
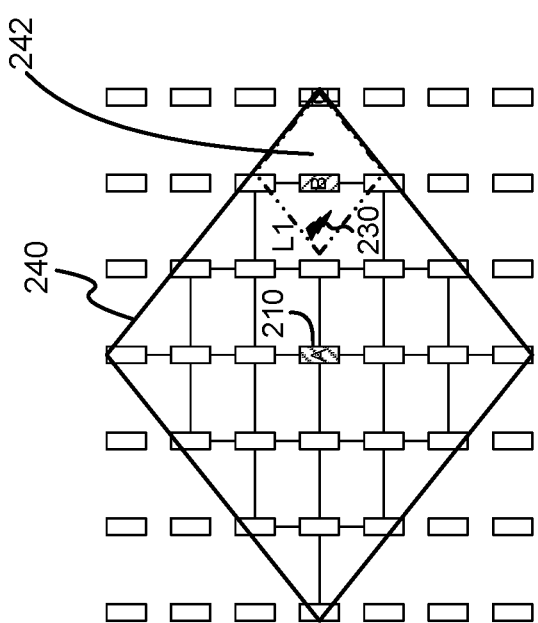

FIG. 2E illustrates the first node's adjusted routing region 240, in response to the failure of link 230. The adjusted routing region 240 includes nodes and links, the failures of which can be reported using a network status update message propagated via no more than three hops. Region 240 differs from region 220 in that section 242 is excluded in region 240 but included in region 220. The membership is adjusted to include nodes within region 240 and to exclude nodes within section 242. FIG. 2F illustrates (in dashed lines) a three-hop shortest-path first routing tree 245 for the first node 210, given the adjusted routing region 240. The adjusted routing tree 245 is provided, again assuming (for simplicity) that no equal cost multipath (ECMP) measures are being taken. The routing tree 245 defines the path by which the first node 210 would route a packet to another node within the region 240. The first node can compute the routing tree 245 after determining the adjusted routing region 240.

Figure 3C:
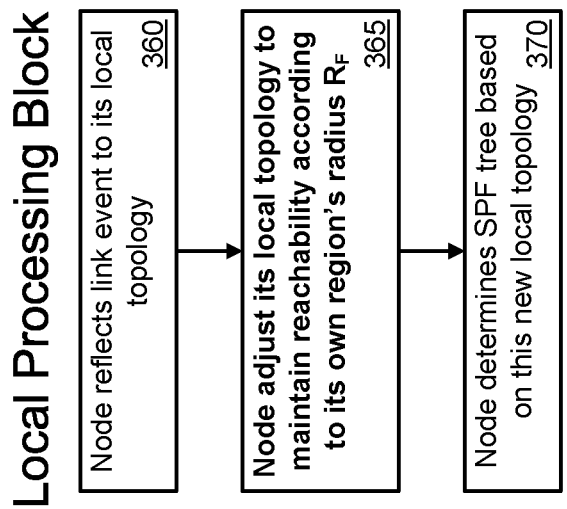

FIGS. 3A to 3C illustrate network node operations provided in accordance with an embodiment of the present invention. Other approaches are also possible. The operations are described, for simplicity, assuming that all nodes in the network (or at least within a portion of the network) operate in the same manner. However, it is considered that different network nodes can act differently while still falling within the scope of the present invention. The present invention provides for both a system of nodes (and associated method) collectively acting as described herein, as well as for an individual node (and associated method) acting as described herein.

It is assumed, for purposes of FIGS. 3A to 3C, that each node maintains information indicative of its own current location, the current locations of its immediate neighbours in the network, and its flood propagation region or radius, denoted $R_F$. $R_F$ can be expressed for example as a hop count, time-to-live count, geographic distance, orthodromic distance, or the like, or a combination thereof. $R_F$ generally represents the distance to which network status update messages are caused to travel within the network before being discarded. By limiting $R_F$, the amount of network resources used propagating network status update messages can be reduced, thus improving efficiency.

FIG. 3A illustrates operation of a network node which initially detects a network event, such as a link failure, node failure link establishment, or node-re-establishment. Upon detecting 305 the network event (which may be an event relating to a communication link terminating at the network node), the node executes 310 the operations illustrated in FIG. 3C, also referred to as the "local processing block." Concurrently, previously, or subsequently, the node also creates 315 a notification of the network event, in the form of a network status update message (which may also be referred to as a flood message). The network status update message may include a location of the network node. The network status update message may include an indication of the flood propagation region or radius $R_F$. After creation 315 of the network status update message, the node transmits 320 the network status update message to all of its (reachable) immediate neighbours in the network.

FIG. 3B illustrates operation of a network node which receives a network status update message, either as initiated according to FIG. 3A or as propagated according to another instance of FIG. 3B occurring at another network node. Upon reception 330 of the network status update message, the network node determines 335 (e.g. by computation) the distance between the node which initiated the network status update message (referred to as node S) and itself. This can be performed for example by decrementing the TTL counter or incrementing the hop counter carried in the network status update message and checking the resulting counter value. The node then determines 340 whether it is within the flood propagation region or radius $R_F$ of node S. If the node is outside of the flood propagation region or radius $R_F$ of node S (e.g. due to the TTL counter after decrementing being equal to zero or due to the hop counter reaching a threshold), then the node terminates 355 the flood, by refraining from forwarding the network status update message to its own immediate neighbours. If the node is inside of the flood propagation region or radius $R_F$ of node S (e.g. due to the TTL counter after decrementing being greater than zero or the hop counter being below a threshold), then the node executes 345 the operations illustrated in FIG. 3C, also referred to as the "local processing block." Concurrently, previously or subsequently, the node also forwards 350 the network status update message (with adjusted counter value, where applicable) to all of its own (reachable) immediate neighbours in the network.

FIG. 3C illustrates the local processing block, by which a node adjusts its routing region (and monitored region) in response to a received network status update message, where applicable. The routing region may be related to the node's local topology, which is a locally held representation of the network topology. This is a representation of the network topology of the node's local region, also referred to as the node's local region network topology. According to FIG. 3C, a node reflects 360 the network event to its local topology. The network event is indicated in the network status update message which triggers the local processing block, or is indicated by direct detection by the node. Reflecting the network event to the local topology may, for example, include updating the node's local representation of the network topology to include new links (when the network event indicates that a new link is available) or to remove existing links (when the network event indicates that a link has failed). The node may then adjust 365 its local topology to maintain reachability according to its own flood propagation region or radius $R_F$. This can correspond to adjusting the membership of the node's limited region. The node can add or remove sub-trees to or from its local topology graph to ensure that each node within its local topology graph is reachable by the distance or number of hops that has been configure as its RF value. The node may adjust (expand or contract) its routing region to more closely match its monitored region, which is changed according to the network event. The node then determines 370 a (e.g. SPF) routing tree based on the adjusted local topology or adjusted routing region. This may involve performing Dijkstra's algorithm on the available information, for example.

Figure 4:
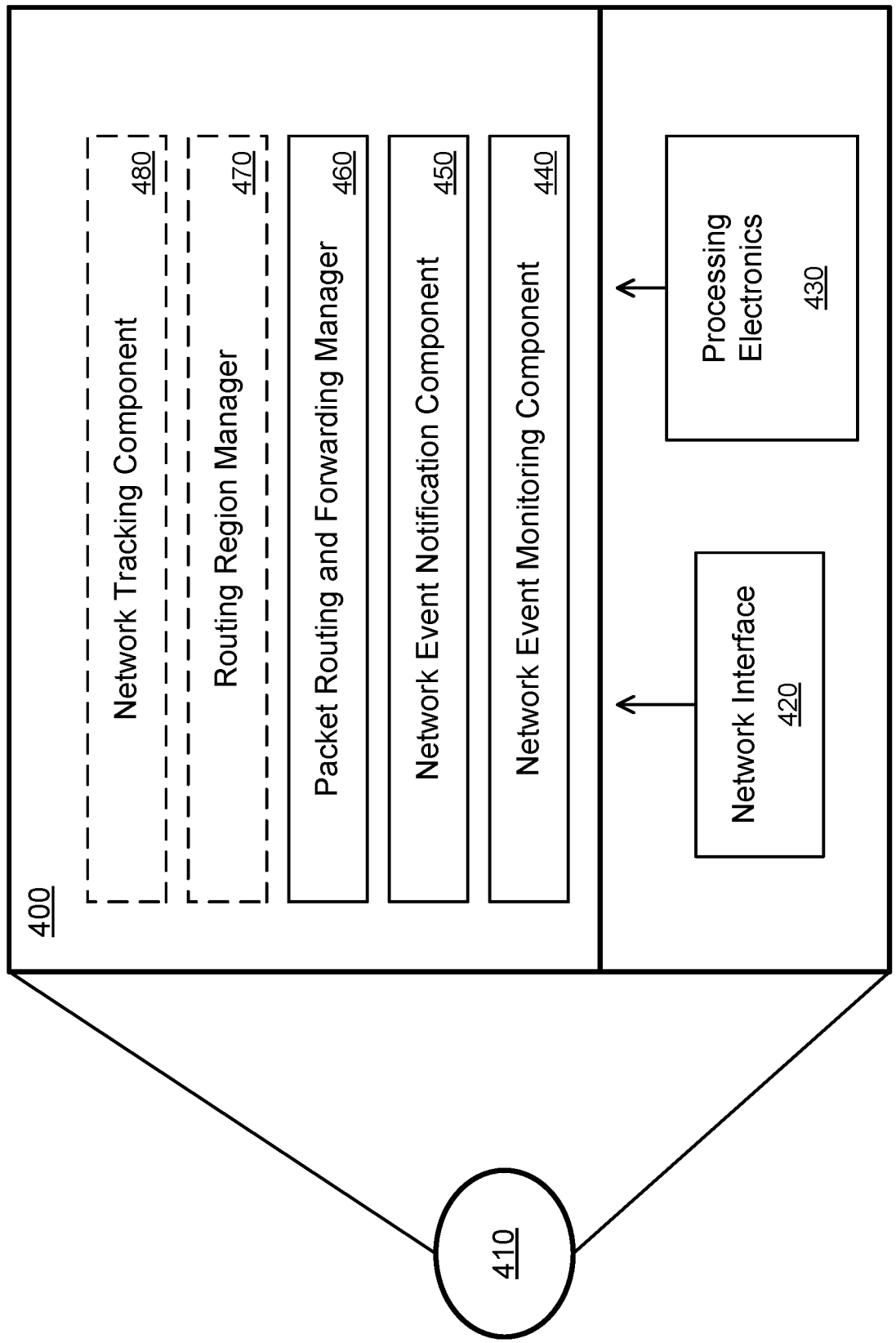
FIG. 4 illustrates an apparatus located in a network node, according to an embodiment of the present invention.

FIG. 4 illustrates an apparatus 400 located in a network node 410, according to an embodiment of the present invention. The apparatus 400 includes a network interface 420 and processing electronics 430. The network interface 420 can be a single network interface or a combination of network interfaces (e.g. including a satellite-to-satellite communication interface and a satellite-to-ground communication interface). The processing electronics can include components such as computer processors, memory, digital or analog circuits, or the like, or a combination thereof. The processing electronics 430 can be configured to provide the network event monitoring component 440, the network event notification component 450, and the packet routing and forwarding manager 460.

The network event monitoring component 440 is configured to monitor for network events, for example by monitoring for nearby link failures, nearby node failures, or messages received via the network interface 420 and indicative of network events such as node or link failures. The messages include network status update messages received from neighbouring nodes and indicative of network events. The network event monitoring component 440 can be configured to maintain network status for a limited region of the network.

The network event notification component 450 is configured to generate messages indicative of network events, for transmission via the network interface, to other network nodes. The messages include network status update messages transmitted to neighbouring nodes. In various embodiments, the network event notification component can perform certain notification-related operations for example as illustrated in FIGS. 3A, 3B, 6A and 6B.

The packet routing and forwarding manager 460 is configured to manage packet routing and forwarding operations. For example, the packet routing and forwarding manager may maintain routing tables, routing trees, representations of network topologies, etc. The information maintained by the packet routing and forwarding manager may be based at least in part on notifications of network events received via the network event monitoring component 440. In some embodiments, the packet routing and forwarding manager may be configured to dynamically adjust the network node's routing region (and monitored region) and local topology based on notifications of network events, as described elsewhere herein for example with respect to FIG. 3C. This can be performed by the packet routing and forwarding manager, or by a related component or sub-component 470, referred to as the routing region manager. Packet handling behaviours can be performed based on the output of the packet routing and forwarding manager. The routing region manager may be configured to adjust membership of the node's limited region in accordance with network status updates, in order to maintain a predefined radius for the limited region.

The apparatus may further include a network tracking component 480 which is configured to track the location of the network node, the location of other network nodes, and related information regarding the network. This information can be used for routing purposes. The network tracking component can provide information to the packet routing and forwarding manager 460 for use in routing and forwarding packets.

Figure 5:
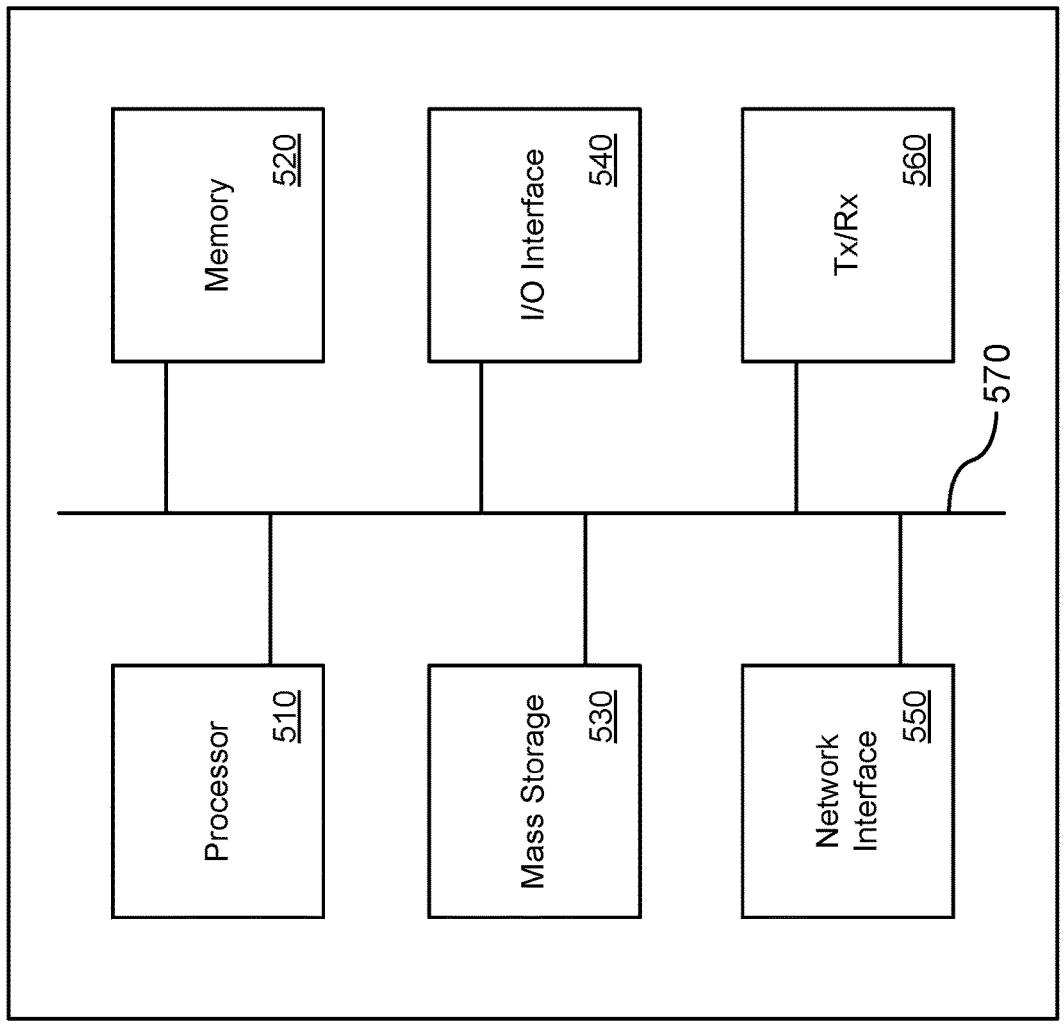
FIG. 5 is a schematic diagram of an electronic device that may perform any or all of operations of the above methods and features explicitly or implicitly described herein, according to different embodiments of the present invention.

FIG. 5 is a schematic diagram of an electronic device 500 that may perform any or all of operations of the above methods and features explicitly or implicitly described herein, according to different embodiments of the present invention. For example, a computer equipped with network function may be configured as electronic device 500.

As shown, the device includes a processor 510, such as a Central Processing Unit (CPU) or specialized processors such as a Graphics Processing Unit (GPU) or other such processor unit, memory 520, non-transitory mass storage 530, I/O interface 540, network interface 550, and a transceiver 560, all of which are communicatively coupled via bi-directional bus 570. According to certain embodiments, any or all of the depicted elements may be utilized, or only a subset of the elements. Further, the device 500 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 520 may include any type of non-transitory memory such as static random access memory (SRAM), dynamic random access memory (DRAM), synchronous DRAM (SDRAM), read-only memory (ROM), any combination of such, or the like. The mass storage element 530 may include any type of non-transitory storage device, such as a solid state drive, hard disk drive, a magnetic disk drive, an optical disk drive, USB drive, or any computer program product configured to store data and machine executable program code. According to certain embodiments, the memory 520 or mass storage 530 may have recorded thereon statements and instructions executable by the processor 510 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for supporting packet routing by a first node in a network, the method comprising:
   maintaining a network status for a limited region of the network, the network status for use in packet routing in the limited region by the first node, wherein the limited region is defined by a membership, the membership including a plurality of nodes in the network that are within the limited region, each node included in the membership connected to other nodes through links within the limited region, the limited region being associated with the first node and having a predefined radius from the first node;
   receiving a first notification of an event associated with at least one of a node included in the membership or a link within the limited region;
   adjusting the membership in accordance with the received first notification to maintain the predefined radius of the limited region; and transmitting a second notification of the event to at least one node in the membership or included in the adjusted membership, the second notification determined in accordance with the first notification.

2. The method of claim 1, wherein the predefined radius is defined by a distance to the first node.

3. The method of claim 1, wherein the predefined radius is defined by a number of network hops to the first node.

4. The method of claim 1, wherein adjusting the membership to maintain the predefined radius of the limited region comprises adjusting the membership to consist essentially of nodes of the network and links of the network to which the first node can route packets, given limited propagation characteristics of said packets.

5. The method of claim 1, wherein the first notification and the second notification are indicative of occurrence of the event, the event affecting the network status.

6. The method of claim 1, wherein the network status includes availability of communication links between nodes in the limited region.

7. The method of claim 1, wherein maintaining the network status comprises maintaining routing information for the limited region of the network.

8. The method of claim 1, wherein transmitting the second notification of the event comprises transmitting the second notification of the event only to immediately neighboring nodes of the first node which are within a predetermined distance of the at least one node included in the membership or the link within the limited region associated with the event.

9. The method of claim 1, further comprising adjusting the network status and wherein transmitting the second notification of the event comprises transmitting the second notification of the event when the at least one node included in the membership or the link within the limited region associated with the event is within a predetermined distance of the first node.

10. The method of claim 9, wherein the at least one of the node included in the membership or the link within the limited region associated with the event is determined to be within the predetermined distance of the first node based on one or more of: a hop counter communicated with the first notification; a time to live counter communicated with the first notification; and an indication of distance between the event and the first node which is determined based on information included in the first notification.

11. An apparatus for supporting packet routing in a network, the apparatus located at a first node of the network, the apparatus comprising a network interface and processing electronics and configured to:

maintain a network status for a limited region of the network, the network status for use in packet routing in the limited region by the first node, wherein the limited region is defined by a membership, the membership defining a plurality of nodes in the network that are within the limited region, each node included in the membership connected to other nodes through links within the limited region, the limited region being associated with the first node and having a predefined radius from the first node;

receive a first notification of an event associated with at least one of a node included in the membership or a link within the limited region;

adjust the membership in accordance with the received first notification to maintain the predefined radius of the limited region; and transmit a second notification of the event to at least one node in the membership or included in the adjusted membership, the second notification determined in accordance with the first notification.

12. The apparatus of claim 11, wherein the predefined radius is defined by a distance to the first node.

13. The apparatus of claim 11, wherein the predefined radius is defined by a number of network hops to the first node.

14. The apparatus of claim 11, wherein the membership is adjusted to maintain the predefined radius of the limited region comprises adjusting the membership to consist essentially of nodes of the network and links of the network to which the first node can route packets, given limited propagation characteristics of said packets.

15. The apparatus of claim 11, wherein the first notification and the second notification are indicative of occurrence of the event, the event affecting the network status.

16. The apparatus of claim 11, wherein the network status includes availability of communication links between nodes in the limited region.

17. The apparatus of claim 11, wherein maintaining the network status comprises maintaining routing information for the limited region of the network.

18. The apparatus of claim 11, wherein transmitting the second notification of the event comprises transmitting the second notification of the event only to immediately neighboring nodes of the first node which are within a predetermined distance of the at least one node included in the membership or the link within the limited region associated with the event.

19. The apparatus of claim 11, wherein the apparatus is further configured to adjust the network status and to transmit the second notification of the event when the at least one node included in the membership or the link within the limited region associated with the event is within a predetermined distance of the node.

20. The apparatus of claim 19, wherein the at least one of the node included in the membership or the link within the limited region associated with the event is determined to be within the predetermined distance of the first node based on one or more of: a hop counter communicated with the first notification; a time to live counter communicated with the first notification; and an indication of distance between the event and the first node which is determined based on information included in the first notification.

* * * * *

UNITED STATES PATENT AND TRADEMARK OFFICE
CERTIFICATE OF CORRECTION

PATENT NO.        : 11,374,652 B1
APPLICATION NO.   : 17/117333
DATED             : June 28, 2022
INVENTOR(S)       : Akhavain Mohammadi It is certified that error appears in the above-identified patent and that said Letters Patent is hereby corrected as shown below:

In the Claims

Column 17, Line 55, Claim 11 "defining a plurality of nodes in the network that are" should be --including a plurality of nodes in the network that are--

Signed and Sealed this
Thirteenth Day of September, 2022

Katherine Kelly Vidal
*Director of the United States Patent and Trademark Office*